Patented Nov. 25, 1947

2,431,419

UNITED STATES PATENT OFFICE

2,431,419

RECOVERY OF VANILLIC ACID

Irwin A. Pearl, Appleton, Wis., assignor, by mesne assignments, to Sulphite Products Corporation, Appleton, Wis., a corporation of Wisconsin No Drawing. Application May 17, 1944, Serial No. 536,039

2 Claims. (Cl. 260—525)

My invention relates to the manufacture of valuable products from lignin or lignin-containing substances, and includes among its objects and advantages a process which, while it can be characterized as degradation, from a chemical point of view, results in the derivation from the original mass of substantially waste material, of four distinct fractions, each of which has potential value.

These fractions are: first, aldehydes, which are chiefly vanillin; second, acids, which are chiefly vanillic acid; third, phenols, which are largely guaiacol and aceto-vanillone; and fourth, neutrals, which are ethers and esters.

Depending on the nature of the raw material processed, and the amount of reagent employed, these four fractions may constitute from 40% to 100% of the original mass.

It is desirable that the lignin-containing material be substantially free of cellulose and sugars. Such ingredients do not do any harm to the desired reactions themselves, but if present they use up the reagents without any beneficial results, and thus increase the expense of the process as a whole.

An illustrative example according to the invention is as follows:

EXAMPLE I

Freshly precipitated silver oxide was prepared by stirring a solution containing 40 parts of sodium hydroxide into a solution containing 170 parts of silver nitrate. The oxide was filtered and washed free of traces of nitrate and partially dried by suction and placed in a vessel with 500 parts of water. To this mass 150 parts of solid sodium hydroxide was added with vigorous stirring, and the heat of solution raised the temperature of the mass to about 60° C. To this warm mass was added 50 parts of basic calcium lignosulfonate, which contained about 60% of lignin. Stirring was continued during this addition and an immediate mirror of silver was formed on the walls of the vessel while the temperature rose to 100° C. and a rather violent boiling took place. The vapors evolved were retained by a reflux condenser, and stirring was continued until the mixture became cool.

The reduction appeared to be complete after a matter of some minutes. Much of the silver was in suspension in such fine particles that it did not settle out even on standing over night. The alkaline solution containing some of the silver in suspension was separated by decantation and the residue was well washed with water and the washings were added to the solution. The solution was then acidified with sulfur dioxide and subjected to continuous extraction with ether. During this treatment the suspended silver all settled to the bottom as a very fine black powder.

The ether extract was then treated with an aqueous solution containing 8% of sodium bicarbonate and when this extract was acidified with dilute sulfuric acid and then again extracted with ether, there was a yield of 5.8 parts of acidic materials. The ether extract remaining was then extracted again with 5% sodium hydroxide solution, and this aqueous extract, after acidification and further extraction with ether, yielded 0.3 part of phenolic material.

The remaining ether solution was then reduced to dryness by evaporating the ether and there remained 0.15 part of waxy neutral material.

The main mass of solution remaining after ether extraction was filtered to remove the black finely divided silver, further acidified with dilute sulfuric acid, aspirated under reduced pressure to complete removal of sulfur dioxide, and then subjected to a second continuous extraction with ether.

This ether solution was first extracted with an aqueous solution of 21% sodium bisulfite. The sodium bisulfite extract was acidified with dilute sulfuric acid and then extracted with ether to yield 3.3 parts of aldehydes.

A second extraction with 8% sodium bicarbonate, and a third extraction with 5% sodium hydroxide, subsequently acidified and extracted again with ether as previously outlined, yielded 2.6 parts of acidic material and 0.28 part of phenolic material respectively. The residual ether, on evaporation to dryness, yielded 0.1 part of waxy neutrals.

The combined yields may be summarized according to the following table:

TABLE

Combined yields of products isolated from preliminary oxidation of basic calcium lignosulfanate with alkali and silver oxide

| Fraction | SO$_2$ Acidified Solution | H$_2$SO$_4$ Acidified Solution | Total | Yield |
|---|---|---|---|---|
|  | Parts | Parts | Parts | Per Cent |
| Aldehydes | | 3.3 | 3.3 | 11.0 |
| Acids | 5.8 | 2.6 | 8.4 | 28.0 |
| Phenols | 0.3 | 0.28 | 0.58 | 1.9 |
| Neutrals | 0.15 | 0.1 | 0.25 | 0.8 |
| Total | 6.25 | 6.28 | 12.53 | 41.7 |

In the foregoing table the right column shows the percentage of yield of each class of material in terms of lignin originally present.

The aldehyde fraction of the above table can be definitely identified as vanillin. The acid fraction can be definitely identified as vanillic acid. The phenolic and neutral materials were not specifically identified. None of these materials were contaminated with silver or organic compounds containing silver and 99.4% of the original silver was recovered in metallic form available for further use.

The process proceeds satisfactorily with any finely divided form of silver oxide. Results substantially identical with the example given, so far as the yields of product are concerned, are easily obtained either with dry silver oxide or by mixing the sodium hydroxide and lignin-containing material and adding silver nitrate to that mixture. The last mentioned procedure is in many instances the most convenient. However, in mass production the procedure of Example 1 could be followed and the step of acidification first with sulfur dioxide omitted, whereas when nitrates and/or nitrites are present in the mass remaining at the end of the reaction, it is necessary to acidify first with sulphur dioxide, so that the accompanying reduction will avoid nitration of the desired product when the sulphuric acid is added later on.

According to any one of the three procedures, the reaction does not start when the initial temperature is materially below 50° C. At or above 50° C. the reaction is spontaneous and vigorous and liberates a considerable amount of heat. Where the main reaction is carried out by adding silver nitrate to a mixture of sodium hydroxide and lignin it is more convenient to start with a temperature not much above 50° C. so that the material can be added at a fair rate without producing too violent a reaction.

The process according to Example I has the further advantage that the nitrate formed when the silver oxide is precipitated is available for reprocessing the metallic silver, to make a complete cyclic process.

The amount of silver oxide employed in the foregoing experiment represented a substantial excess, and the use of smaller amounts of silver is primarily a problem of economy considering the cost of the lignin-containing material compared with the cost of reprocessing the silver.

In experiments of this type, there remains a degraded form of lignin in amounts varying from 5% to 35% of the lignin originally present. In such an example as Example I the yield is about 25%. This degraded material still has the general appearance of lignin and is of a highly phenolic character, but it is soluble in solutions acidified with sulfur dioxide, and partially soluble in aqueous solutions of stronger acids.

EXAMPLE II

Purification of the acid fraction resulting from Example I to secure vanillic acid of a high degree of purity, may be accomplished as follows:

The crude material is boiled in water and filtered and then treated hot with an excess of neutral lead acetate. A small amount of yellow precipitate will separate, which should be filtered after standing, and washed with the washings added to the filtrate.

Upon treating the combined filtrate and washings with hydrogen sulphide, a black precipitate of lead sulfide is secured. The mixture is then boiled to remove excess hydrogen sulfide and filtered, and the colorless filtrate is concentrated. Upon cooling the concentrated solution, colorless crystals of vanillic acid having a sharp melting point at 208–9° C. were obtained. The high purity of this product may be further demonstrated in that the mixed melting point with authentic vanillic acid is not lowered. Such purification has yielded a purified product amounting to 92% of the crude product.

Any lignin-containing substances may be advantageously treated as hereinabove disclosed. Examples of interest are the lignin remaining after the holo-cellulose content of wood has been subjected to saccharification; the lignin-containing waste from acid or alkaline pulping processes; and wood in any form, corn cobs, straw, etc.

These materials, as well as the other lignin source material specifically recited in Example I, are among the materials to which the invention is applicable.

Without further elaboration, the foregoing will so fully explain my invention that others may readily adapt the same for use under various conditions of service.

I claim:
1. In the method of purifying a vanillic acid containing acid fraction obtained by the degradation of a lignin substance, the improvement which consists in removing impurities by precipitation with neutral lead acetate, filtering, and recovering vanillic acid from the filtrate.

2. In the method of purifying a vanillic acid containing acid fraction obtained by the degradation of a lignin substance, the improvement which consists in removing impurities by precipitation with neutral lead acetate, filtering, treating the filtrate with hydrogen sulfide, removing the resulting lead sulfide precipitate from the filtrate, and recovering vanillic acid from the filtrate.

IRWIN A. PEARL.

REFERENCES CITED

The following references are of record in the file of this patent:

UNITED STATES PATENTS

| Number | Name | Date |
|---|---|---|
| 716,878 | Faunce | Dec. 30, 1902 |
| 2,057,117 | Sandborn et al. | Oct. 13, 1936 |
| 2,104,701 | Sandborn | Jan. 4, 1938 |
| 2,296,952 | Ross et al. | Sept. 29, 1942 |

OTHER REFERENCES

Tiemann, Ber. Deut. Chem., vol. 8 (1875), page 513.

Kurschner et al., Technologie und Chemie der Papier U. Zellstoff-Fabrication, No. 3, June 4, (1932), page 38.

Herissey et al., Chem. Absts., vol. 33 (1939), column 8921.

Lautsch et al., Argewandte Chemie, vol. 33, (1940), pages 450–452.

Pearl, Journal Am. Chem. Soc., vol. 64 (1942), pages 1429–1431.